E. HARROLD.
CUTTER BLADE FOR JOINTERS AND PLANERS.
APPLICATION FILED NOV. 29, 1913.
1,150,677.
Patented Aug. 17, 1915.
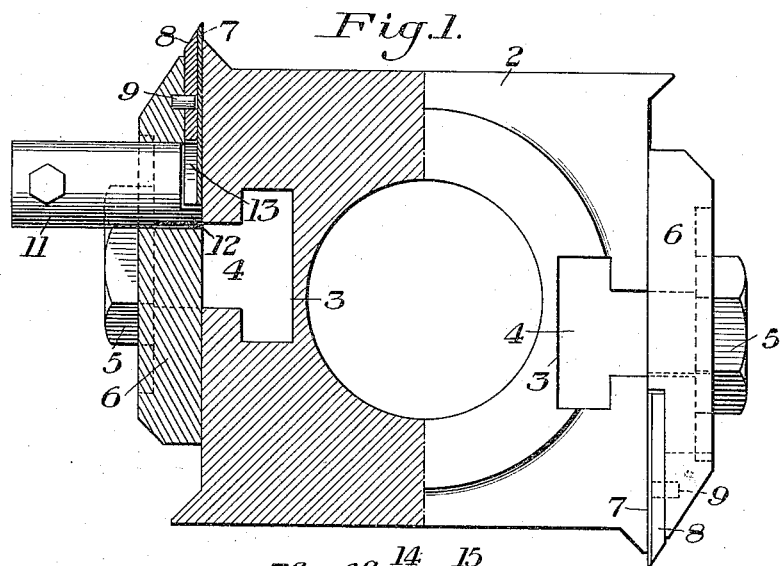
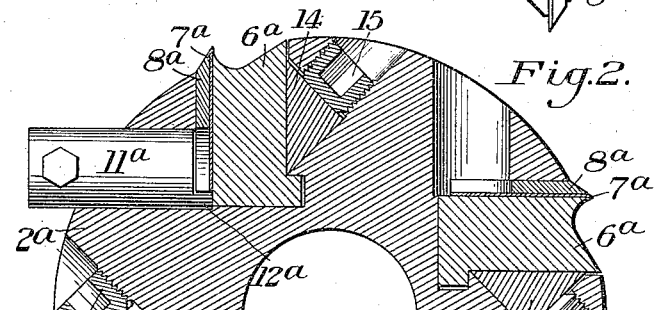
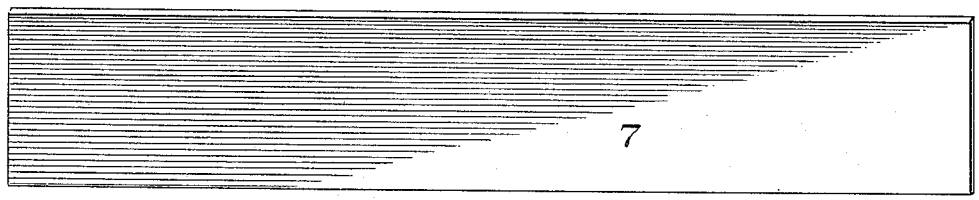
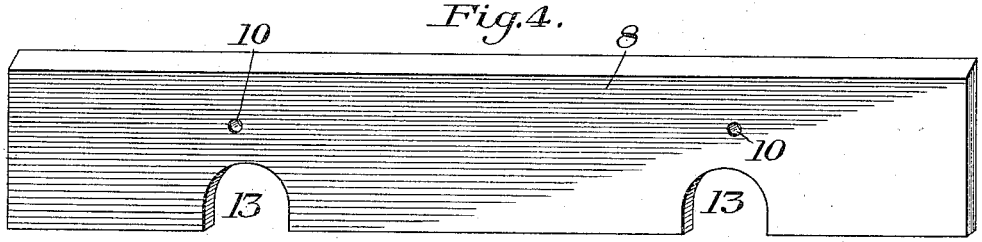
WITNESSES
R A Balderson
Jesse B Heller
INVENTOR
Elmer Harrold
by Bakewell, Byrnes & Parmelee
Attys

UNITED STATES PATENT OFFICE.

ELMER HARROLD, OF LEETONIA, OHIO, ASSIGNOR TO THE CRESCENT MACHINE COMPANY, OF LEETONIA, OHIO, A CORPORATION OF OHIO.

CUTTER-BLADE FOR JOINTERS AND PLANERS.

1,150,677.  Specification of Letters Patent.  Patented Aug. 17, 1915.

Application filed November 29, 1913. Serial No. 803,692.

*To all whom it may concern:*

Be it known that I, ELMER HARROLD, a citizen of the United States, and a resident of Leetonia, in the county of Columbiana and State of Ohio, have invented a new and useful Improvement in Cutter-Blades for Jointers and Planers, of which the following is a full, clear, and exact description, reference being had to the accompanying drawings, forming part of this specification.

This invention relates to an improvement in cutter blades for jointers and planers, and is designed to provide a device of this character in which the cost of the blades is materially reduced without decreasing their efficiency.

It is well known to those familiar with the art of tool making that a relatively thick bar of high carbon steel will be slightly changed in shape after it has passed through the tempering process. The bar is buckled or twisted by the unequal strains set up in the molecules of the metal which are placed under tension during the hardening process. After the bar has been hardened, the sides and cutting edge are shaped by grinding, so that the blade may be clamped in position in the cutter head without distorting the edge of the blade or changing its initial shape. I have discovered that I can materially reduce the initial cost of these cutter blades, as well as greatly reduce the cost of maintenance without loss of efficiency. This is accomplished by making a two-part blade of approximately the same shape and size as the former blades for the various cutter heads. One member of these blades is made from a strip of thin high carbon tool steel, which has been rolled to shape, tempered and then ground to form a cutting edge. The other member may be formed from a bar of rolled machine steel which may be finished by machining.

The precise nature of my invention will be best understood by reference to the accompanying drawings, which will now be described, it being premised, however, that various changes may be made in the details of construction of the cutter head as well as the shape of the blade without departing from the spirit and scope of my invention as defined in the appended claims.

Figure 1 is an end view, partially in section of one form of cutter head, in which I have shown one form of my improved cutter blade. Fig. 2 is a transverse section of a portion of another form of cutter head. Fig. 3 is a perspective view of the cutting member of the blade; and Fig. 4 is a similar view of the backing member of the blade.

In Fig. 1 of these drawings, the reference character 2 designates the cutter head, which is provided with a plurality of T-slots 3. Within these T-slots 3 are the T-bolts 4, having nuts 5 for holding the keepers 6 in position on the cutter head. These keepers are provided with longitudinal recesses for the reception of the cutter blades, which are formed of the two members 7 and 8. The member 7 is the cutting member of the blade and is formed from a thin strip of tool steel which is tempered and ground along one of its longitudinal edges to form a beveled cutting edge. This member is formed from a very thin strip of steel which is too light to withstand the strains to which it is subjected when in use, unless it is backed up or reinforced by another member having sufficient strength to resist the strains. This cutting member is backed up by the member 8, which is provided with a beveled edge, which approximately forms a continuation of the beveled edge of the cutting member. Seated within openings in each of the keepers 6 are pins 9, which enter openings 10 in the backing members 8, and are arranged to maintain the backing members in proper position with relation to the center of the cutter head. These, however, may be omitted, as in Fig. 2. Extending through the keepers 6 is a plurality of openings for the reception of an adjusting wrench, such as shown at 11, and which is provided with a projection 12 which extends below the cutting member 7 of the cutter blade. The backing member 8 of each of the cutters is provided with openings 13, which are coincident with the openings in the keepers, so that the cutting members 7 may be adjusted relatively to the backing members.

In Fig. 2, I have shown a blade secured in a different form of cutter head, and in which I have identified similar parts with the same characters, with the letter "a" affixed. In this form the cutter blades are held in position by means of keepers 6ª, which are located in longitudinal slots in the cutter head. These keepers are clamped in position against the cutters by means of auxiliary keepers 14, which are held in position by means of screws 15.

By the use of a blade of this character, the cutting members can be made at a comparatively low cost as the initial cost of material is greatly reduced, as well as the cost of manufacturing the cutting member. The material from which these cutting members are formed can be rolled to shape, cut to length and then tempered without grinding or finishing any portion thereof with the exception of the cutting edge. Even though these blades should be slightly buckled during the tempering operation, they will be clamped in proper position to straighten them during the grinding of the cutting edge and when the cutting members are placed in position and clamped in the cutter head, the cutting edges will again be brought to their proper position. As the cutting members are formed from a very thin strip of steel any slight buckling which is caused by the tempering will be removed when the member is clamped for grinding or is clamped in position in the cutter head.

The advantages of my invention result from the provision of a two-part cutter blade, the cutting member being formed from a relatively thin strip of steel which is provided with a beveled cutting edge and a backing member for the cutting member having a beveled edge which approximately forms a continuation of the beveled edge of the cutting member and which extends the full length of the cutting member to reinforce it. As the cost of these cutting members will be very slight, the user can afford to throw away the cutting member after it has become nicked. The cost of a new member does not exceed the cost of grinding a blade of the old type which had been nicked to any extent.

I claim:

1. A cutter head having a cutter blade keeper, there being a longitudinally extending seat for a cutter blade, said cutter blade having two members, one of said members being formed from a thin strip of tool steel and provided with a beveled cutting edge and too thin to stand the strains to which the blade is subjected when in use, the second member extending parallel with the first member and being comparatively thick, to form a backing for the first member, means for retaining the second member in position in the recess, there being wrench receiving openings extending into the recess, recesses in the second member coincident with the wrench receiving openings, and means for clamping the cutter blade members within the longitudinal recess; substantially as described.

2. A cutter head having a longitudinally extending recess, a keeper and a cutter blade within said recess, said cutter blade having two members, one of said members being formed from a thin strip of tool steel and provided with a beveled cutting edge, said member being too thin to stand the strains to which the blade is subjected when in use, the second member extending parallel with the first member and being comparatively thick to form a backing for the first member, means for retaining the second member in position in the recess in the cutter head, there being wrench receiving openings in the cutter head extending into said recess, recesses in the second member coincident with the wrench receiving openings, and means for clamping the cutter and the keeper within the longitudinal recess; substantially as described.

In testimony whereof, I have hereunto set my hand.

ELMER HARROLD.

Witnesses:
A. F. TIBBETTS,
FRANCES BECKETT.

Copies of this patent may be obtained for five cents each, by addressing the "Commissioner of Patents, Washington, D. C."